United States Patent

[11] 3,558,911

| [72] | Inventor | Muchuan M. Chen<br>Upper Darby, Pa. |
|---|---|---|
| [21] | Appl. No. | 828,967 |
| [22] | Filed | May 29, 1969 |
| [45] | Patented | Jan. 26, 1971 |
| [73] | Assignee | General Electric Company<br>a corporation of New York |

[54] UNDERFREQUENCY RELAY
9 Claims, 3 Drawing Figs.

[52] U.S. Cl. .................................................... 307/129,
340/171
[51] Int. Cl. .................................................... H01h 35/00
[50] Field of Search .......................................... 307/129,
73; 317/138, 147, 142, (Inquired); 340/171, 248,
167B, (Inquired)

[56] References Cited
UNITED STATES PATENTS

| 3,187,234 | 6/1965 | Muranaka et al. ............. | 340/171X |
| 3,388,313 | 6/1968 | Fisher ............................ | 307/129X |
| 3,438,037 | 4/1969 | Leland ........................... | 340/171 |

Primary Examiner—Robert K. Schaefer
Assistant Examiner—H. J. Hohauser
Attorneys—J. Wesley Haubner, Albert S. Richardson, Jr., Frank L. Neuhauser, Oscar B. Waddell and Melvin M. Goldenberg

ABSTRACT: A digital underfrequency relay for load conservation and the like is provided. The relay monitors power system frequency, and when a subnormal frequency below a preset limit is detected a cyclic control signal is produced. This condition must persist continuously for a predetermined period of time before the relay will issue an underfrequency indicating output signal, and the requisite timing is accomplished by means substantially unaffected by variations in frequency during the delay period.

PATENTED JAN 26 1971

3,558,911

INVENTOR:
MUCHUAN M. CHEN,
BY Albert S. Richardson Jr
ATTORNEY

UNDERFREQUENCY RELAY

The present invention relates to a frequency sensitive relay and more particularly to an improved relay for monitoring the frequency of an input signal and for issuing an output signal upon the occurrence of certain abnormally low frequency conditions.

The use of underfrequency relays in load conservation schemes for electric power transmission and distribution systems is well known, one typical use being the interrupting or shedding of sizeable blocks of noncritical load during emergency conditions. For many years it was common practice to install electromechanical type underfrequency relays for this purpose. While generally satisfactory, such relays do have some shortcomings. For example, the operation of an electromechanical relay may be adversely affected by electrical transients, temperature variations, or mechanical shock. Such problems generally placed constraints on the clearing time for corrective action by electromechanical underfrequency relays. Additionally, the operating time of such relays depends on the net driving torque on the moving element, and since the driving torque is relatively small right at the pickup or set frequency and increases with increasing frequency deviation, an electromechanical relay tends to operate quite slowly at low rates of frequency change. Therefore, in the interest of reliability, stability, and precision, those working in this are art have naturally turned to known "digital" counting techniques for sensing frequency.

In practice it is important to prevent premature operation of an underfrequency relay in the event of a temporary reduction in frequency due to normal switching transients or the like. Toward this end it is desirable to inhibit tripping of the associated protective device for a predetermined short time delay (e.g., 0.4 second) following detection of an underfrequency condition. If normal frequency is restored during this delay period, the relay is automatically reset. Where the requisite time delay is measured by counting subfrequency cycles, an error is possible because the period of the input signal increases with decreasing frequency. For example, assuming that the relay is set to operate at an underfrequency level of 59 Hertz with a time delay of 390 milliseconds obtained by counting 24 consecutive subfrequency cycles, the delay would be undesirably extended to 460 milliseconds if the frequency in fact fell to 50 Hertz, which condition would indicate a need to operate faster, not slower. Accordingly, one objection of the present invention is to provide an improved digital underfrequency relay in which this possibility of error is minimized.

After an abnormal underfrequency condition has been detected and corrective measures have been taken, the power system frequency will tend to rise and it is desirable to signal this event by reclosing the protective device in response to the return of frequency to either the set point frequency or a new frequency level. However, reclosing should not be initiated before the generator speed has time to stabilize, or else the system frequency might oscillate enough to cause undesirable cycling of the underfrequency relay. A further object of my invention is to provide a digital underfrequency relay in which reclosing can be delayed for a predetermined interval of time which is adjustable, as desired, independently of the aforesaid reset function.

The various features and advantages of the invention will be more fully appreciated from the following description taken in conjunction with the accompanying drawing in which.

Figure 1:
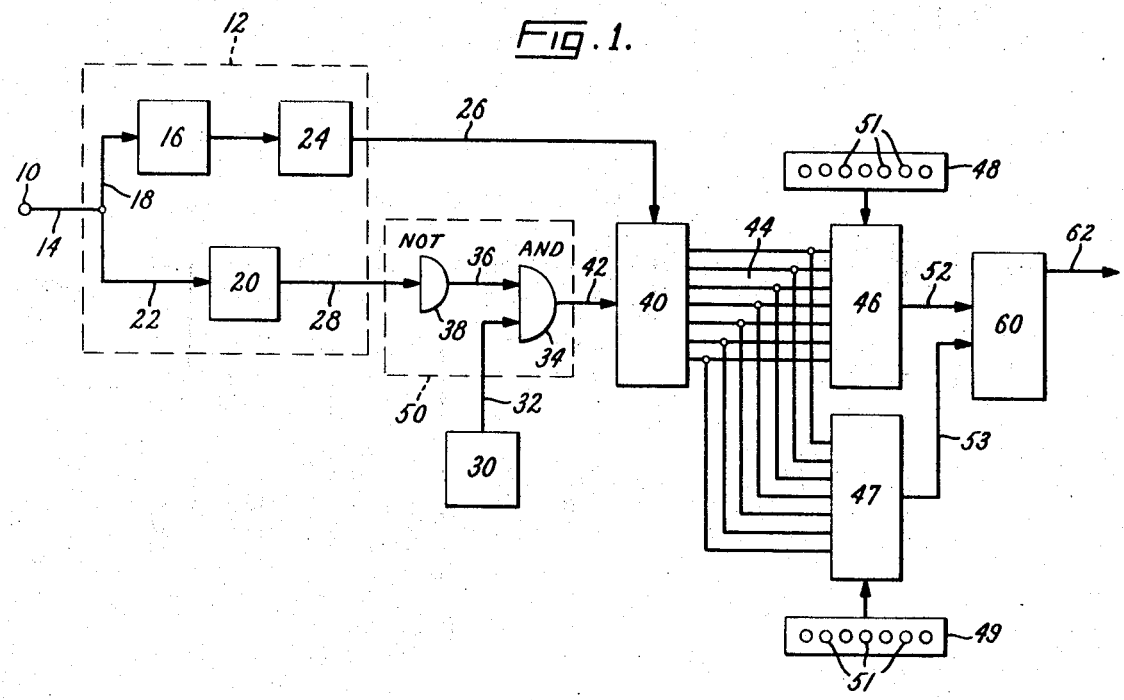
FIG. 1 is a schematic block diagram depicting the general arrangement of one form of frequency responsive relay.

Referring to FIG. 1, a periodic input signal whose frequency is to be monitored is received at the input 10 of the relay. Ordinarily this input signal is an alternating voltage, such as an electric power system secondary voltage, having a frequency of $f$ Hertz. While $f$ can vary from a predetermined nominal magnitude (e.g., 60 cycles per second), under normal conditions it remains inside a preset limit. An input conductor 14 interconnects the input 10 and input circuit means 12. Input circuit means 12 includes an input signal conditioning circuit 16 which is adapted to receive the input signal over conductor 18, and an undervoltage detector circuit 20 which receives the input signal over input conductor 22. Input signal conditioning circuit 16 is effective to eliminate harmonics and transients on the AC input signal as well as the effect of any DC offset. The output from signal conditioning circuit 16 is applied to a zero crossing detector 24 by means of conductor 23. Zero crossing detector 24 converts the signal conditioner output into well defined pulses corresponding to each positive going zero crossing of the monitored input signal. The well defined pulses produced by detector 24 provide one output of circuit 12 over conductor 26. These pulses recur at time intervals equal to $\frac{1}{f}$, and each represents a reset or recycle pulse for an individual input signal cycle. The other output of circuit 12 is provided over conductor 28 by the undervoltage detector circuit 20. Circuit 20 senses the average magnitude (amplitude) of the monitored input signal and provides a blocking signal if that magnitude falls below a predetermined level for a given time period.

Also shown in FIG. 1 is a constant frequency clock or reference means 30 which supplies a train of high frequency pulses (e.g., 2 MHz.) to a binary or digital counter 40 through a buffer amplifier 50. The clock 30, which in one form is a crystal controlled oscillator, is continuously operative and its output is is applied over conductor 32 to a first input of an AND gate 34. The second input to AND gate 34 is received over conductor 36 and is derived from the undervoltage detector 20. The blocking signal from the detector 20 is coupled to a NOT gate 38. This will inhibit the passage of actuating pulses from clock 30 to counter 40 when the monitored input voltage is below a predetermined level. The actuating pulses from buffer amplifier 50 are applied over conductor 42 to a first input of counter 40. The zero crossing detector 24 is coupled by conductor 26 to a reset or clear input of the counter 40. Counter 40 is cleared once for each cycle of the monitored input signal by a reset pulse from the zero crossing detector 24.

A plurality of output conductors 44 from the various stages of the counter 40 are respectively coupled to the inputs of first preset circuit means 46 comprising appropriate logic components and circuits. The logic circuit 46 is preset to a predetermined first frequency $F_1$ through a frequency set block 48 having a plurality of tap screw adjustments 51. For any desired frequency setting, preset logic 46 is set to detect a predetermined number of accumulated pulses in 40. So long as the monitored frequency $f$ is inside (higher than) the preset limit $F_1$, counter 40 will be cleared by the reset signal over conductor 26 before it accumulates the given count. On the other hand, whenever the monitored frequency is outside (under) the preset level, there is sufficient time between reset pulses over conductor 26 to enable the counter to accumulate at least the predetermined number of pulses. Upon this occurrence the preset logic 46 will produce an overflow or first control pulse over conductor 52. The first control pulse indicates one full cycle of operation at a frequency under $F_1$, and 52 will then be energized by a train of control pulses recurring once per subfrequency cycle of the monitored input signal. Preferably the described circuitry is arranged to recycle automatically if the input frequency falls below some unusually low level such as 30 Hertz.

The control pulses over conductor 52 are applied to a control circuit 60. Control circuit 60 is operative to issue a sustained output signal over conductor 62 in delayed response to receipt of the first control pulse. This output signal can be used to control a protective device such as a circuit breaker (not shown) in the power distribution system, to signal an alarm, to start a timer, to activate a logic circuit, etc. As will soon be apparent from the description of FIGS. 2 and 3 below, the relay is immediately reset without issuing any output signal if the input signal frequency returns to normal at any time prior to the expiration of the pickup time delay introduced by control circuit 60. Thus, a true underfrequency condition is ensured, and false operation due to short term transient conditions is prevented.

As is shown in FIG. 1, the output conductors 44 from counter 40 are also coupled to the respective inputs of second preset circuit means 47 which is similar to logic circuit 46 except preset to detect a predetermined second frequency $F_2$. Preferably $F_2$ is lower than 60 Hertz, and higher than $F_1$. Whenever the frequency of the monitored input signal is outside (under) the preset limit $F_2$, preset logic 47 is operative to produce over conductor 53 another train of overflow or control pulses having a frequency correspondence to the input signal. The second control pulse over conductor 53 are also applied to the control circuit 60 which is operative to terminate the output signal over conductor 62 in delayed response to restoration of the input signal to the second preset frequency $F_2$.

Figure 2:
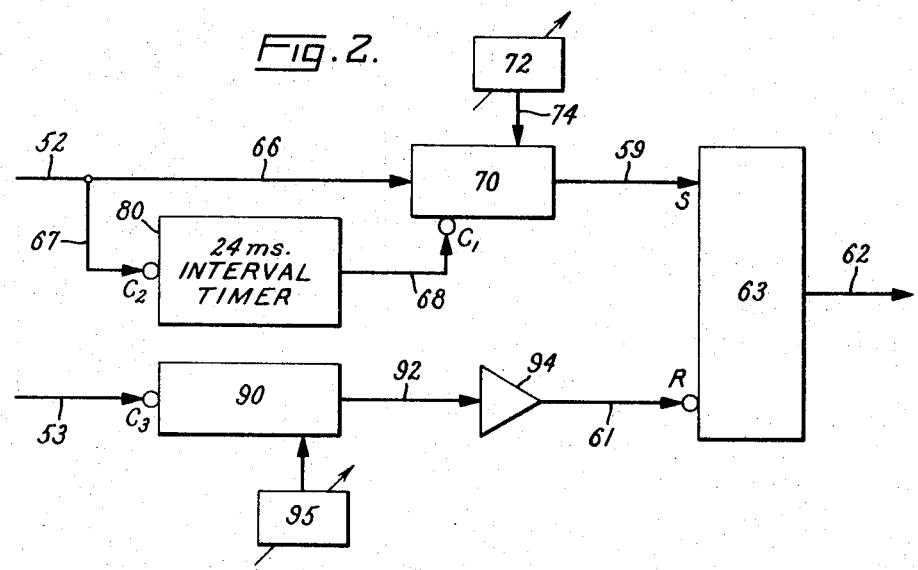
FIG. 2 is an expanded schematic block diagram showing one form of control circuitry depicted as a single block in FIG. 1.

FIG. 2 depicts a preferred form of the control circuit generally indicated by the numeral 60 in FIG. 1. This control circuit comprises a time delay pickup circuit 70 having a first input coupled over conductor 66 to receive the control pulses generated over conductor 52, a second or clear input $C_1$ and an output coupled over conductor 59 to the set input of a bistable "flip-flop" 63. Variable time delay adjusting means 72 is coupled to the pickup circuit 70 over conductor 74. The circuit 70 includes means for supplying a setting pulse over conductor 59 to the flip-flop 63, which concurrently issues the output signal at conductor 62, a predeterminable time after actuation in response to the first control pulse over conductor 52 unless earlier disabled by associated means 80. The disabling means 80 is provided for quickly clearing and resetting the timing function if the underfrequency condition is cured before the output signal of the relay is issued.

Preferably the disabling means 80 comprises a constant interval timer such as a monostable type relaxation oscillator which is normally operative to apply periodic pulses over a conductor 68 to the clear input $C_1$ of the circuit 70. The normal operating period of the timer 80 is selected to be approximately 24 milliseconds (about 1.5 times the nominal period of the input signal). By providing the timer 80 with a clear input $C_2$ which is coupled via a conductor 67 to the conductor 52, the normal disabling operation of this timer is itself inhibited whenever successive control pulses are received at intervals shorter than 24 milliseconds. Consequently the interval timer 80 is inhibited by the same train of control pulses that activates the timing means in the pickup circuit 70 when the monitored frequency is under the present level $F_1$. But if one pulse in this train were omitted, due to the frequency returning above $F_1$, interval timer 80 will not be cleared and will disable the pickup circuit 70 by applying a clear pulse over conductor 68 a half-cycle later. This in turn causes circuit 70 to restart its timing operation upon receipt of the next control pulse.

Figure 3:
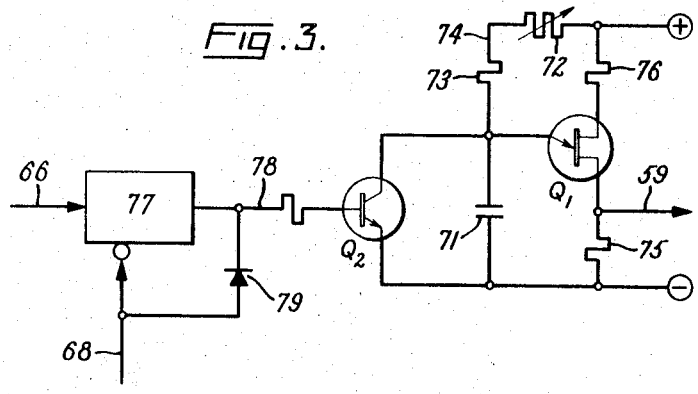
FIG. 3 is an expanded schematic diagram showing one form of the time delay pickup circuitry generally depicted in FIG. 2.

In accordance with my invention, the timing means in the pickup circuit 70 is arranged to operate, once activated, independently of the frequency of subsequent control pulses received over conductors 52 and 66. A preferred embodiment of the circuit is shown in FIG. 3. The time delay means referred to here comprises a capacitor 71 in series with a fixed resistor 73 and a rheostat 72 (which corresponds to the block identified by the same reference number in FIG. 2), which combination is connected between relatively positive and negative terminals of a suitable source of control power. The capacitor is shunted by a normally conducting transistor Q2 and hence is normally discharged. To activate this timing means, the transistor Q2 is turned off whereupon the series resistor-capacitor circuit is effectively energized by the constant voltage of the control power source to which it is connected. The capacitor 71 will now charge at a rate which depends on the setting of the rheostat 72, and when its voltage subsequently attains a predetermined level, an associated level detecting and pulse forming circuit is triggered. The latter circuit is illustrated in FIG. 3 as a conventional unijunction transistor Q1 whose bases are respectively connected to the control power terminals via resistors 75 and 76 and whose emitter is connected to the junction of capacitor 71 and resistor 73. When the capacitor voltage reaches the value of the emitter peak point voltage of the unijunction transistor Q1, this transistor is triggered and abruptly discharges the capacitor 71 through resistor 75. The resulting pulse of voltage across resistor 75 comprises the setting pulse for the flip-flop 63 which is coupled thereto by the conductor 59. The length of time required for the above-described operation can be continuously varied as desired over a wide range (e.g., 8 to 1,000 milliseconds) by the vernier adjustment provided by the rheostat 72, and once set it is immune to erroneous variations due to variations in the deviation below the set point $F_1$ of the actual frequency being monitored.

The integrating timing means in the pickup circuit 70 is connected to the control pulse conductor 66 by suitable means for maintaining the transistor Q2 in a normally conducting state and for turning off this transistor in response to a first control pulse being produced by the preset logic 46 of the frequency responsive circuit previously described. Preferably this interconnecting means comprises an electronic counter 77 which normally supplies a signal over a conductor 78 to forward bias the transistor Q2 and which is preset to discontinue or terminate this signal when a predetermined fixed number of consecutive control pulses (e.g., 3 pulses) are received over input conductor 66. On termination of the forward bias signal, transistor Q2 turns off and the timing means 71—73 is activated. The time required by the digital counter 77 to activate the integrating timing means (e.g., approximately 34 milliseconds for a three cycle count at a frequency of 58.9 Hertz) is added to the minimum delay introduced by the integrating timing means (e.g., 8 milliseconds) to give the shortest period of underfrequency to which my relay is designed to respond following an initial control pulse from the frequency responsive circuit.

If a clear pulse were received over conductor 68 from the associated disabling means 80 after an initial control pulse is registered in the counter 77 and before the unijunction transistor Q1 is triggered, the counter 77 will be immediately cleared and simultaneously the transistor Q2 will be turned on to ensure that the timing capacitor 71 is then discharged. For the latter purpose the conductor 68 is shown coupled directly to the conductor 78 by an isolating diode 79.

In accordance with another feature of the invention, the control circuit 60 includes separate means for resetting the flip-flop 63, thereby terminating the output signal over the conductor 62, in delayed response to the monitored frequency being restored to a level higher than $F_2$, and this "reclosing" delay is adjustable independently of the disabling means 80. In the FIG. 2 embodiment the resetting means comprises a reset timer 90 having a clear input $C_3$ coupled to conductor 53 for receiving the second train of control pulses from second preset logic 47. A buffer amplifier 94 receives the reset timer output pulse over conductor 92, and the output of amplifier 94 is applied over conductor 61 to a reset input R of the flip-flop 63. The timer 90 is similar to the interval timer 80 except that its characteristics operating interval can be varied, beyond a given minimum which preferably is about 10 times the nominal period of the input signal, by associated time delay adjusting means 95.

So long as the monitored frequency is under $F_2$, which is the frequency preset by circuit 47, the second control pulses generated over conductor 53 will periodically clear the reset timer 90 and thereby inhibit its normal operation. But when the monitored input frequency returns above $F_2$, the control pulses over conductor 53 are discontinued and, on the expiration of a predetermined interval of time following the last such pulse, the reset timer 90 is operative to generate an output signal over conductor 92. The signal over conductor 92 is amplified by buffer amplifier 94 and is applied to reset input R of flip-flop 63. This terminates the output signal over conductor 62, which event indicates that the monitored frequency has returned inside (above) the second preset level $F_2$ and remained there for the desired time interval. The reset timer 90 will then continue periodically generating reset signals until the monitored frequency again falls under $F_2$, whereupon this timer is immediately cleared by the initial pulse in the second train of control pulses produced by the logic circuit 47 and further reset signals are inhibited.

While a preferred form of my invention has been illustrated and described, it is apparent that modifications and alterations may be made therein. For example, the second logic circuit 47 could be set so that $F_2 = F_1$. The relay could be arranged to respond to abnormal overfrequency rather than under frequency conditions. Hence, it is the intention in the appended claims to cover all such modifications as may fall within the true spirit and scope of the invention.

I claim:

1. In a relay for monitoring the frequency of a periodic signal, said frequency under normal conditions being inside a preset limit and said relay being arranged to issue an output signal in response to certain abnormal frequency conditions, the combination of:
   a. a frequency responsive circuit adapted to be energized by said input signal and operative to produce a control pulse for each cycle of said input signal whenever the frequency thereof is outside said limit;
   b. time delay means coupled to said frequency responsive circuit and operative to issue said output signal a predetermined time after activation thereof unless earlier disabled, said time delay means being activated in response to a control pulse being produced by said frequency responsive circuit and, once activated, being arranged to continue its timing operation independently of the frequency of subsequent control pulses; and
   c. means for disabling said time delay means and thereby preventing issuance of said output signal in response to the frequency of said input signal returning inside said preset limit.

2. The relay defined in claim 1 in which said frequency responsive circuit is arranged to produce control pulses when the frequency of said input signal is under said preset limit.

3. The relay defined in claim 2 in which said time delay means includes means for adjusting the length of said predetermined time.

4. The relay defined in claim 3 in which an electronic counter is connected between said time delay means and said frequency responsive circuit, said counter being preset to activate said time delay means when a predetermined number of control pulses are consecutively produced.

5. The relay defined in claim 4 in which said time delay means comprises the series combination of a capacitor and a rheostat adapted to be energized by constant voltage upon activation of the time delay means, and means for issuing said output signal in response to the voltage across said capacitor attaining a predetermined level.

6. The relay defined in claim 2 in which said disabling means is normally operative to periodically disable said time delay means, said disabling means including means coupled to said frequency responsive circuit and activated by the control pulses for inhibiting operation of the disabling means so long as the interval between successive control pulses is shorter than the normal operating period of said disabling means.

7. In a relay for monitoring the frequency of a periodic input signal having a predetermined normal frequency, said relay being arranged to issue an output signal in response to certain abnormal frequency conditions, the combination of:
   a. a frequency responsive circuit adapted to be energized by said input signal and operative to produce a first train of control pulses having a frequency correspondence to the input signal whenever the frequency thereof is under a predetermined first level and to produce a second train of control pulses having a frequency correspondence to the input signal whenever the frequency thereof is under a predetermined second level, said second level being lower than said normal frequency and said first level being lower than said second level;
   b. first means coupled to said frequency responsive circuit for issuing said output signal in delayed response to said first train of control pulses being produced;
   c. means for disabling said first means and thereby prevent issuance of said output signal in response to the frequency of said input signal returning above said first level; and
   d. second means operative independently of said disabling means for normally terminating said output signal, said second means being coupled to said frequency responsive circuit and having its normal operation inhibited while said second train of control signals is being produced and for a predetermined interval of time following return of said input signal frequency above said second level.

8. The relay defined in claim 7 in which said second means includes means for adjusting said predetermined interval of time.

9. The relay defined in claim 7 in which said first means is operative to issue said output signal a predetermined time after activation thereof unless earlier disabled, said first means being activated in response to a control pulse in said first train and, once activated, being arranged to continue its timing operation independently of the frequency of subsequent pulses in said first train.